Sept. 15, 1959 J. A. RAJCHMAN ET AL 2,904,626
ELECTRICAL DISPLAY DEVICE
Filed May 31, 1955 9 Sheets-Sheet 1

Fig. 1.

INVENTORS
JAN A. RAJCHMAN &
GEORGE R. BRIGGS
BY
ATTORNEY

United States Patent Office

2,904,626
Patented Sept. 15, 1959

2,904,626

ELECTRICAL DISPLAY DEVICE

Jan Aleksander Rajchman and George Roland Briggs, Princeton, N.J., assignors to Radio Corporation of America, a corporation of Delaware Application May 31, 1955, Serial No. 511,953

17 Claims. (Cl. 178—5.4)

The present invention relates to electrical display devices for displaying luminous or visible patterns in accordance with modulated electrical signals.

The electrical display device according to the present invention employs a novel arrangement including a matrix or array of elemental light emitting areas and includes a unique means at each elemental light emitting area for selecting image or pattern information relating to that elemental area, storing that information and controlling the light output of the corresponding light emitting area in accordance with that information. An electrical display device according to the present invention will be referred to hereinafter as a mural image reproducer, or as an image reproducer.

Elemental area selection, information, storage and luminosity control is provided by the use of ferroelectric switching and storage devices which are a member of the broad class of devices termed transhysteretic devices of which another member, the transfluxor—a ferro-magnetic device—has been described in detail in the copending application entitled "An Electrical Display Device" bearing the U.S. Serial No. 511,848, by J. A. Rajchman.

A transhysteretic device is a device constituting an aggregate of materials having a plurality of distinct paths each of which may be saturated at remanence and adjusted between each of two stages of saturation corresponding to each extremity of a hysteresis loop. A driving force or forces applied to one or more of the paths may be utilized to control the apparent characteristics of the hysteresis loop characterizing that path or paths to provide control of power reaching an external load by way of coupling through one or more of the paths. In a ferroelectric transhysteretic device, hereinafter referred to as a transcharger, hysteresis-loop relationships exist between the remanent charge and the coercive voltage. As will be shown in more detail in the specification to follow, a transcharger may be utilized to store an input signal and control the transmission of electrical power in accordance with the stored signal. Transchargers have the ability to also select information signals.

It is an object of this invention to provide an improved type of electrical display device.

It is another object of this invention to provide an improved electrical display device which does not require an evacuated envelope thereby eliminating the need of a scanning beam and the need for focusing.

It is an object of this invention to provide means for image reproduction utilizing ferroelectric switching, storage and control devices.

According to the invention a ferroelectric device is associated with each elemental luminiferous area of an electrical display device. Each ferroelectric device corresponding to an elemental area is responsive to a sequence of signals relating to the location of that elemental area and to the image information to be accorded that elemental area. The ferroelectric device then controls the light output of the corresponding elemental area so that the overall image display device will store and reproduce a visible image in accordance with an applied information signal.

In one form of the present invention, ferroelectric devices, responsive to the aforementioned signals, may be utilized for controlling the light output of electroluminescent elemental areas. Moreover, a color image may be reproduced by a mural image reproducer according to the present invention by subdividing each elemental light emitting area into groups of subelemental light emitting areas, each emitting a suitable primary color and energized according to the signal related to the light output corresponding to that primary color at that elemental light emitting area.

Other and incidental objects of this invention will become apparent upon a reading of the specification and a study of the drawings wherein.

Figure 1:
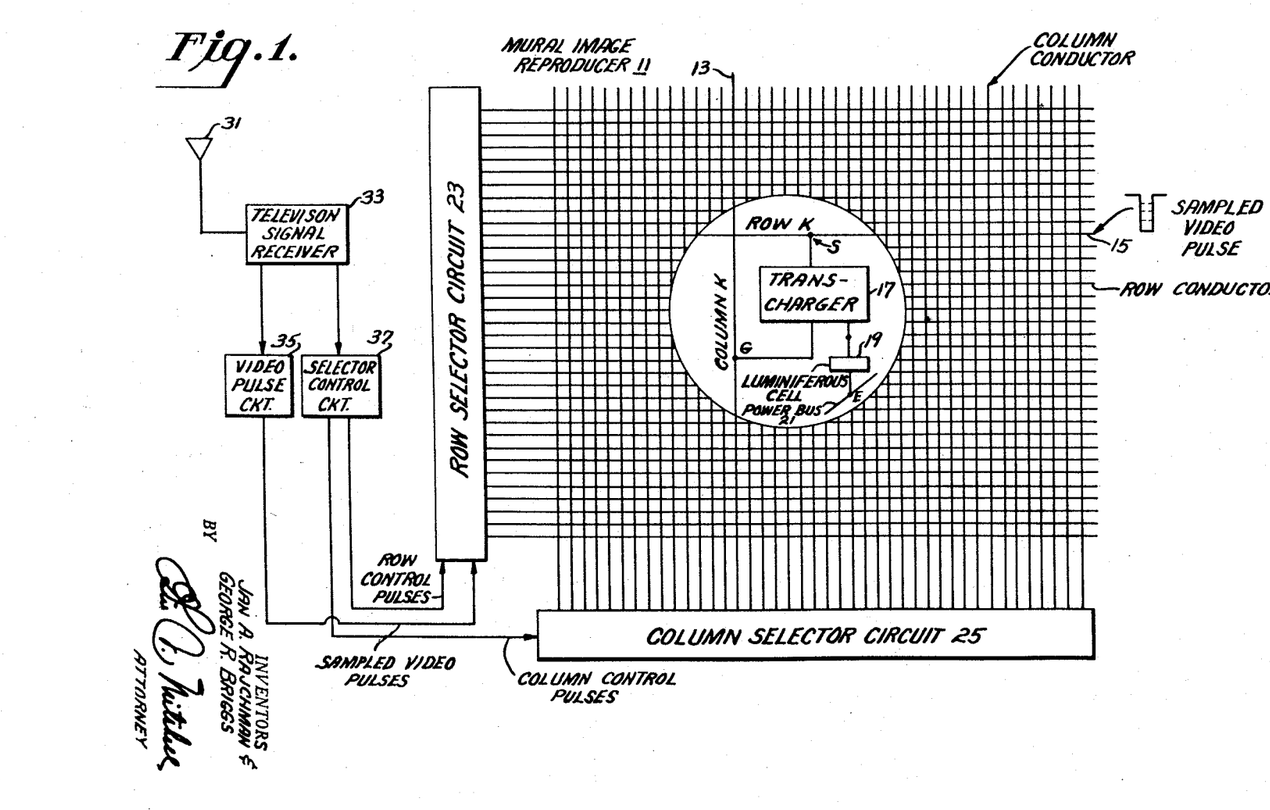
Figure 1 shows a block diagram of one form of the present invention.

Figure 1 shows a block diagram of one form of the present invention. Included in the block diagram is a mural image reproducer 11. The mural image reproducer 11 consists of rows and columns of conductors which are arrayed contiguously to form a frame of geometric shape. At, for example, the intersection of column conductor $k13$ and row conductor $k15$, a transcharger 17 is installed which is coupled to the point S on row K15 and the point G on column $k13$. The transcharger 17 selects row and column image information which is applied to it. Responsive to the image information pulses corresponding to that elemental area, the transcharger 17 then controls the light output from the luminiferous cell 19. The luminiferous cell 19 is also coupled to the point E on the power bus 21 which is common to all of the intersections of the rows and columns. The various rows of the mural image reproducer 11 are selected by the row selector circuit 23; the columns of the image reproducer 11 are selected by the column selector circuit 25. In one form of the invention, the image information pulses are applied to the row selector circuit, to be transmitted on each row conductor as that row conductor is selected. Alternatively the image information pulses can be applied to the column selector circuit 25 for application to a selected column conductor.

If the mural image reproducer 11 is to be used for reproducing television images, then the transcharger 17 controlling each elemental areas will select the video information relating to that area and control the light output from the luminiferous cell 19 accordingly.

When the mural image reproducer 11 is utilized for the reproduction of the television image, then the complete circuit which is block diagrammed in Figure 1 may be utilized. The incoming television-signal-modulated carrier arrives at the antenna 31 and is impressed on the television signal receiver 33. The television signal receiver 33 demodulates the video signal from the television-signal-modulated carrier in a manner well known in the communications art. For a general description of how video signals may be demodulated from a television-signal-modulated carrier, see, for example, the paper entitled "Television Receivers" by Antony Wright, in the RCA Review for March 1947.

The video signal also includes the picture synchronizing signals, which can be separated from the video signal by well known means. The video signal from the television signal receiver 33 is thereupon applied to the video pulse circuit 35 and the separated mural synchronizing signals to the selector control circuit 37. The video pulse circuit 35, in one form of the invention, develops a series of pulses whose amplitude is representative of the television image information to be presented at elemental areas of the image reproducer 11. The selector control circuit 37 actuates the row selector circuit 23 and the column selector circuit 25, which, responsive to row control pulses and column control pulses from the selector control circuit 37 causes the correct sequence of rows to be selected, with each row scanned by having the column selector circuit 25 successively select each column conductor along that row.

It is to be appreciated that to reproduce a television image transmitted according to U.S. standards of 525 lines, the mural image reproducer 11 may employ typically 525 rows and about 700 columns.

The mural image reproducer 11 in Figure 1, for television image reproduction, will employ a proper selection of rows, say, row 1, row 3, row 5 . . . and row 2, row 4, row 6 . . . for every frame as in an interlaced scanning scheme. For applications other than television applications, the selection of rows and columns are dependent upon the particular application involved. For radar or P.P.I. (point position indicator) systems, the mural image reproducer 11 may consist of actually only a single long row which is spirally assembled to form a substantially circular pattern reproducing device or may be assembled with rows and columns whereby the columns will provide information along a radius in a circular trace indicator and the rows will provide information along the azimuth of the circular trace indicator.

The transcharger 17 is responsive to the coincidence of area location and video signal information at the intersection of columns and rows. The coincidence of these signals at each intersection will cause the transcharger 17 to deliver corresponding video information to an associated luminiferous cell 19. The transcharger 17 is a signal-coincidence switch, as will be shown. It also has the property of being able to store the video or pattern information relating to the intersection to control the light output from the associated luminiferous cell 19 indefinitely.

Figure 2:
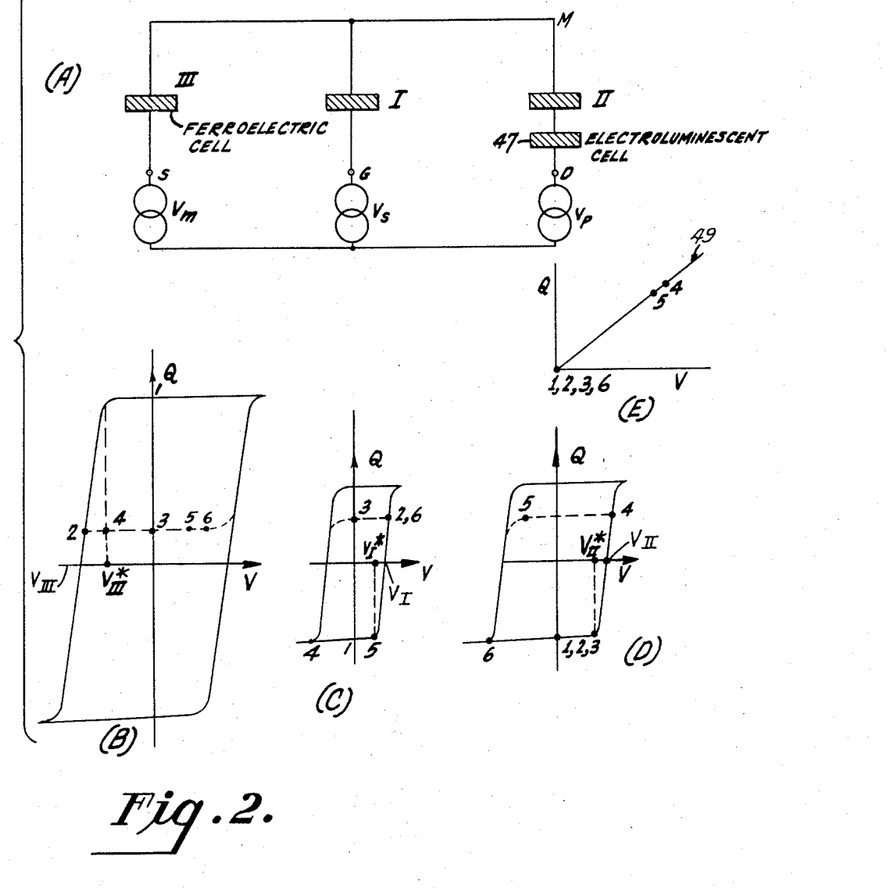
Figure 2a shows a transcharger.
Figures 2b, 2c, and 2d illustrate hysteresis curves relating to the ferroelectric cells of a transcharger.
Figure 3:
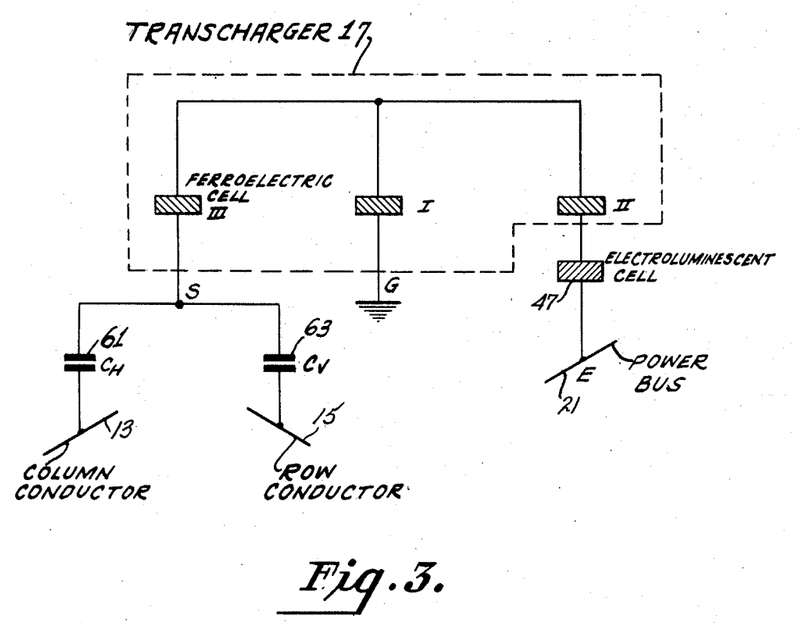
Figure 3 shows another method of connecting a transcharger.

The transcharger 17 shown in Figure 3 includes three ferroelectric cells I, II, and III. These ferroelectric cells may be constructed typically of such materials as $BaTiO_3$. Ferroelectric materials of this type have the properties of saturation and remanence characteristics which enable them to function as transhysteretic devices when grouped as an aggregate of the form shown in Figure 2a. The transcharger is utilized for controlling indefinitely a flow of alternating electric power according to a single electric pulse setting. For an extensive description of the aggregate of ferroelectric devices in the form referred to as transchargers, see the copending application by the present inventors bearing the title "Ferroelectric Systems," U.S. Serial No. 511,915.

The operation of the transcharger 17 may be described as follows:

The ferroelectric cells I, II, and III have coercive voltages $V_I$, $V_{II}$, and $V_{III}$ of increasing value, that is, $V_I$ is the smallest and $V_{III}$ is the largest as is shown by the idealized hysteresis loops of these cells which are shown respectively in Figures 2c, 2d and 2b. The remanent charge Q of ferroelectric cell III is equal to or larger than the sum of the equal remanent charges of the ferroelectric cells I and II. A luminiferous cell of the electroluminescent type, hereinafter referred to as an electroluminescent cell 47, is in series with the ferroelectric cell II and may be considered for all practical purposes to be a pure capacitance represented by a straight line 49 on a Q—V plot. One terminal of each of the ferroelectric cells I, II, and III is connected to the common terminal M. It is noted from Figure 2a that the opposing terminals of the ferroelectric cells I and III are connected to terminals G and S which have been described in connection with, for example, column $k13$ and row $k15$ of Figure 1.

The operation of the form of the transcharger shown in Figure 2A is as follows: let the voltage source $V_m$ supply a large positive pulse which polarizes the ferroelectric cells as indicated by the points 1 in Figures 2b, c, and d. The voltages of all cells are measured from point M for convenience. The cells I and II are now "blocked," i.e., no flow of charge results from applying an alternating voltage $V_p$ of moderate amplitude to the point D, since either cell I or II is saturated in the direction in which there is a tendency for charge to change. With $V_p$ returned to zero, next apply a negative pulse $-V_m$ which does not exceed the value $(V_{III}^* + V_I^*)$ where, $V_I^*$, $V_{II}^*$, and $V_{III}^*$ refer to voltages corresponding to the "knees" of the corresponding hysteresis curves of ferroelectric cells I, II, and III. Again no flow of charge will occur because the voltage required to cause switching in the path made up of cells III and I has not been exceeded. The minimum voltage required to cause switching in the path made up of cells III and II has also not been exceeded because $V_{II}^*$ is greater than $V_I^*$. With $V_m$ zero, a positive voltage $V_s$ of the same magnitude $(V_{III}^* + V_I^*)$ can be applied to point D without causing switching of cells I and III, and switching around the path made up of cells I and II is prohibited because one of these cells is already saturated in the direction of the applied field. Thus application of restricted amplitude voltage to either points S or G has no effect.

If voltages $V_m$ and $V_s$ are applied simultaneously, however, their sum may be sufficient to cause switching around the path made up of cells I and III. In particular, if $V_s = V_I^* + V_{III}^*$, then for any value of $V_m$ less than zero some switching will occur around this path. If the hysteresis loops of the cells are not perfect but have finite slopes in the switching regions as indicated in Figure 2 then the amount of switching will depend on the magnitude of $V_m$; in particular $V_m$ may be of such a value to cause switching to point 2 on each loop. Upon the termination of $V_s$ and $V_m$, the cells will be in the state indicated by point 3. If now the alternating voltage $V_p$ is applied, the cells I and II can be switched because the polarizations are not now completely opposed. When $V_p$ is in its positive phase nothing happens until this voltage exceeds $V_{II}^* + V_I^*$ (it is assumed that the knee of the minor loop of cell I originating at point 3 has the same voltage $V_I$ as the knee of the major loop), but then cells I and II start to switch to the points 4. The negative voltage appearing across cell I also appears across cell III, but if $V_p$ is limited so that the maximum voltage appearing across cell I at point 4 is less than the coercive voltage of cell III, no switching of cell III can occur. During this process the voltage across the electroluminescent cell 47 which can electrically be considered as a capacitance (actually some leakage is present, but this is not too important here) will be dropped to same voltage as shown by the point 4 on the Q—V plot (Figure 2e). During the charging of the electroluminescent cell 47 a changing electric field is present in the material of the cell and this causes light to be produced; this light will continue to be produced for a short time after the field has stopped changing. At the termination of the positive pulse $V_p$, a small amount of charge flows out of the electroluminescent cell 47 back through cells I and II due to the lack of perfect rectangularity of the loop of the ferroelectric material, and point 5 is reached. The voltage left on the electroluminescent cell 47 cannot exceed $V_I^* + V_{III}^*$, otherwise cells I and II will be partially switched back again.

During the negative phase of the alternating voltage $V_p$, cells I and II are switched to points 6 if $V_p$ is large enough in magnitude and the charge in the electroluminescent cell 47 is removed. While the charge in electroluminescent cell 47 is charging another light energizing pulse $V_p$ is produced. The voltage appearing across cell III is now in the direction to switch this cell, but since this coercive voltage of cell I is less than the coercive voltage of cell III, cell I will absorb all the available charge of cell II before cell III has a chance to switch.

The next positive phase of $V_p$ will switch cells I and II again and charge the electroluminescent cell 47 to points 5 as before, producing another light pulse. The next negative phase will return the device to the points 6 producing further light, etc. Light will continue to be produced while the device is being energized by the voltage $V_p$. The amount of light produced by the electroluminescent cell 47 increases with increasing peak cell voltage. This peak cell voltage in turn increases, the larger the amount of charge exchanged between cells I and II. This charge is equal to the change of charge introduced in cell I via cell III during the initial setting process; this charge depends upon the magnitude of the setting pulse $V_m$. Thus the amount of light increases with decreasing $V_m$ ($V_m$ is a voltage having negative polarity), to some maximum value determined by the saturation Q of cells I and II. A definite threshold of light production also exists because it is found that the electroluminescent cell produces no light if the peak voltage across it is less than a certain value. It is therefore possible to control the light output from zero to some maximum value by varying the magnitude of $V_m$. If $V_m$ is applied simultaneously with a pulse of fixed magnitude $V_s$, light can be produced, but if $V_s$ alone or $V_m$ alone is applied to the device no charge exchange can occur and no light can be produced. Thus the coincidence between $V_s$ and $V_m$, with $V_s$ typically acting as a threshold pulse, serves to select the proper image or pattern cell of the display device and video information corresponding to $V_m$ will be impressed upon the selected cell.

Once a transcharger has been set to produce a certain light output, the light output can be reduced conveniently by first re-blocking cells I and II. This is conveniently done by applying a large positive $V_m$ ($V_s$ maintained equal to zero during this process), returning the cells to the points 1 shown in Figure 2. This operation is performed just before the cell is to be selected for new video information. Since $V_m$ only is used for blocking, blocking of a whole row of elements must be done at the same time. This function of blocking is performed just before the selected row is to be scanned by the column selector 25. To make certain that cells I and II can be placed in the states represented by points 1, regardless of their original orientation by the blocking pulse, the sum of the maximum charges required to switch these cells completely must be capable of being supplied by switching cell III. If the remanent charges of cells I and II are equal, the remanent charge of cell III must be equal to or larger than twice the remanent charge of cell I or II.

In the blocked state, no flow of charge can occur when $V_p$ is applied to the device, as long as the positive phase of $V_p$ is limited in amplitude. If $V_p$ is limited in this phase to less than $V_{III}^* + V_{II}^*$ no switching around the path composed of cells II and III can occur. This consideration places a limit on the amount of light which can be produced during the positive phase of $V_p$ when the transcharger is unblocked, but this can be compensated for by the increased light obtained by driving the transcharger with a larger amplitude negative phase of $V_p$. There is no limit imposed on the amplitude of the negative phase of this voltage.

In the image reproducer of the type using the transcharger 17 shown in Figure 2a, the setting of each transcharger is obtained typically, by linear addition of an image or pattern information pulses provided on a row conductor and a column scanning pulse. Each of these pulses has an amplitude which is below the setting threshold of the transcharger and is insufficient by itself to produce any setting. The setting depends upon the precise value of the sum of the pulses.

The linear addition of the image or pattern pulses and the column scanning pulse can also be obtained by means of condenser couplings as is shown in Figure 3. The condenser 61 is coupled between the terminal S and the column conductor 13. The condenser 63 is coupled between the terminal S and the row conductor 15. The terminal G is connected to ground. The image pulses and the row scanning pulses which are applied concomitantly to the column and row conductors 13 and 15 are of the same polarity. The terminal S thereupon assumes the average value of these pulses, the averaging being determined by the magnitudes of the capacitance of the condensers 61 and 63.

It is possible to take the average of more than two applied pulses. For example, in a row of transchargers, the points 5 can be connected to a video or pattern signal bus common to all elements in the row. The column and row conductors 13 and 15 will be made to carry scanning pulses of fixed amplitudes whose sum is sufficient to reach the threshold of setting of each transcharger at the proper time. The video or pattern signal applied to the common bus would then cause the sum of the three signals, namely the video signal and the column and row conductor signals, to exceed the threshold of the scanning element and of that element only to an extent determined by the video pulse.

Figure 4:
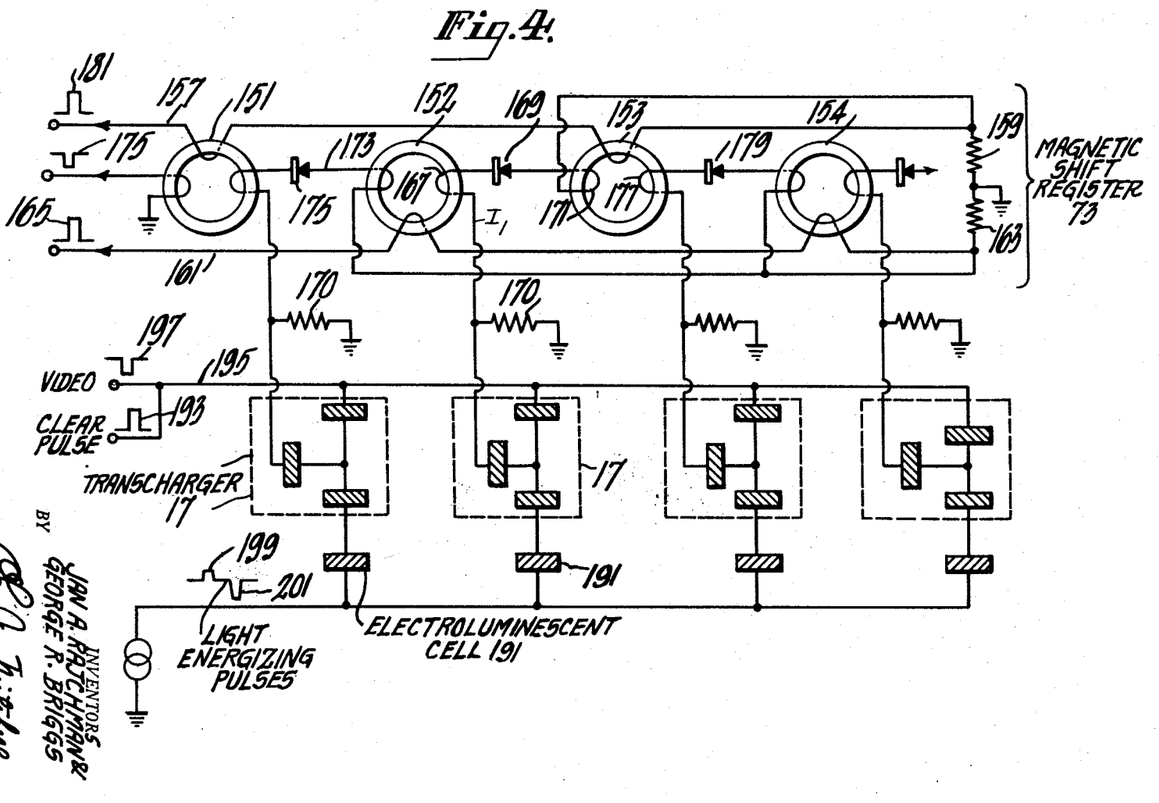
Figure 4 shows a schematic diagram of a row of transchargers and electroluminescent cells actuated by a magnetic shift register.

Figure 4 shows a schematic diagram of a row of transchargers 17 which are controlled or scanned by a magnetic shift register 73. The magnetic shift register 73 shown in Figure 4 illustrates one type of column selector circuit which may be utilized in an image reproducer. The particular magnetic shift register 73 illustrated is a switching circuit of unusual reliability and positive action and has been described in detail in the copending application by Rajchman, Briggs and Lo, bearing the title "Magnetic Systems" and the U.S. Serial No. 512,056, now abandoned.

Figure 7:
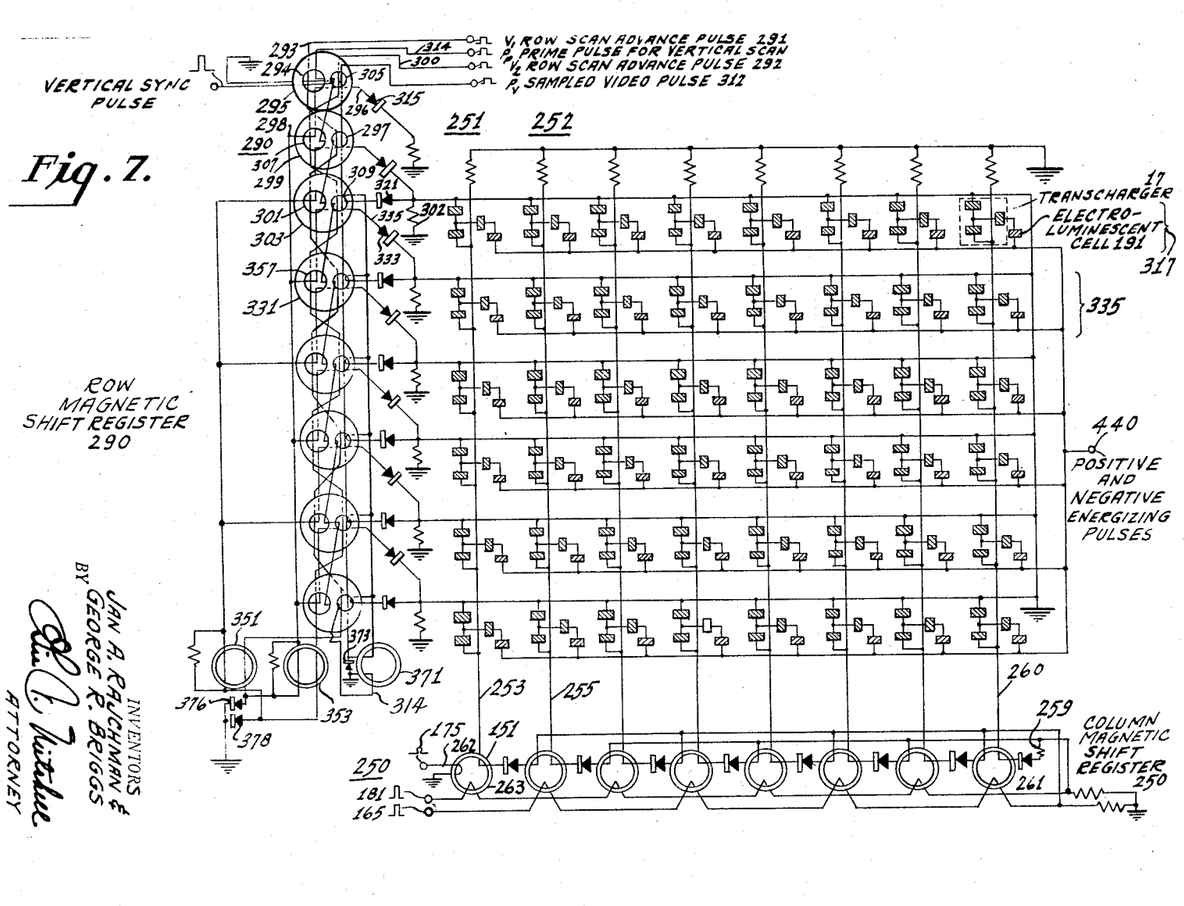
Figure 7 illustrates a schematic diagram of several rows and columns of a mural image reproducer utilizing transchargers and including the row and column selector circuits.

A discussion of the switching process associated with a single row of a mural image reproducer will serve as an introduction to the switching process shown in Figure 7 where the rows will in turn be controlled by a row magnetic shift register.

The magnetic shift register shown in Figure 4 is utilized to scan a row of transchargers. This magnetic shift register 73 will be utilized to select each column of transchargers in succession by providing a voltage pulse of fixed amplitude to set the corresponding transcharger to a threshold for accepting video information. The magnetic shift register 73 includes a series of magnetic cores 151, 152, 153 and 154, each of which is at remanence in a normal state (N state) or in an abnormal state (P state). The line 157 passes respectively through cores 151 and 153 and is coupled to ground by way of resistor 159. The line 161 passes respectively through the cores 152 and 154 and is coupled to ground by way of resistor 163.

Consider the operation of core 152 at a time when all of the other cores are in the normal state and core 152 is in an abnormal state. Let a current pulse 165 of the polarity shown be sent through the line 161. This current passes through core 152 which is thereupon switched from the abnormal state to the normal state. A current $I_1$ is thereupon produced in the winding 167 which is coupled to core 152; this current $I_1$ is caused to flow through the diode 169 and to pass through the coupling loop 171 whereby core 153 is switched from normal state to abnormal state.

The switching of core 152 also produces a voltage in the winding 173; however, no current results from this voltage because of the blocking diode 175 so that the preceding core is not affected. This blocking action of diode 175 is due to the bias on bus 174 due to voltage developed across the resistance 163 by the current pulse.

The switching of core 153 from a normal state to an abnormal state in the manner previously mentioned produces a voltage in the winding 177; this voltage does not produce any current because diode 179 is polarized in the wrong direction thereby preventing this switching of core 153 from affecting core 154.

It thereupon follows that the application of the current pulse 165 at a time when all cores but core 152 are in normal state, produces the action of switching core 152 to the normal state and core 153 to the abnormal state. If a current pulse 181 is applied to the terminal 183 after current pulse 165, and if this current pulse 181 is caused to pass through the core 153 by way of the line 157, core 153 will then be switched from an abnormal state back to a normal state with this switching action then causing core 154 to be switched from a normal to an abnormal state. With the application of current pulses 181 and 165 applied alternately through each of the lines 157 and 151, the cores are successively switched from a normal to abnormal state according to the switching action described in the following table wherein core 151 is referred to as core I, core 152 is referred to as core II and so on:

| Time | Core I | Core II | Core III | Core IV | Core V | Core VI |
|---|---|---|---|---|---|---|
| $T_1$ | P | N | N | N | N | N |
| $T_2$ | N | P | N | N | N | N |
| $T_3$ | N | N | P | N | N | N |
| $T_4$ | N | N | N | P | N | N |
| $T_5$ | N | N | N | N | P | N |
| $T_6$ | N | N | N | N | N | P |

At $T_1$, core 151 is switched on to start the sequence by an input pulse 175; at $T_2$ the current pulse 165 is produced; at $T_3$ the current pulse 181 is produced, and so on. The table shows how the switching of each core from normal to abnormal state and then back to normal state follows from core to core in the magnetic shift register at a rate and sequence prescribed by the timing of the current pulses 165 and 181.

Consider again the action of core 152; this time with respect to its controlling the transcharger 17. When the voltage is produced in the winding 167, this voltage causing core 153 to switch from normal to abnormal state, the current $I_1$ is caused to pass through resistance 170 to develop a positive voltage which when applied to the transcharger 17, sets the transcharger to a threshold level.

Figure 4 shows each of the element transchargers 17 coupled to an electroluminescent cell 191. During the scanning of a row as represented in the circuit shown in Figure 4, the magnetic shift register is utilized to set each element transcharger to a threshold level at a rate and sequence corresponding to the scanning of that line.

The energizing and switching of the transchargers shown in Figure 4 is produced by the pulse sequence described as follows: At the start of excitation of the row by pulse 175, a clear pulse of voltage 193 is applied to each of the transchargers and clears or blocks all of the transchargers of the row; its function is to remove any stored settings and to set each transcharger to a state wherein no output is produced. The clear pulse 193 passes through the line 195 in Figure 4 and at the same time pulse 175 passes through the core 151 to set this core in the abnormal state P.

The switching of core 151 by the pulse 181 results in the shifting of core 151 from the abnormal state to the normal state again thereby adjusting the transcharger 17 to its threshold of setting. It is to be noted that core 151 need not necessarily be attached to a transcharger but may be utilized to provide a delay for the starting of the scanning operation. The magnetic shift register will be actuated by a sequence of pulses 181 and 165 until the final core is reached; the magnetic shift register will then be in a condition wherein all of its cores are in the abnormal state again; they will remain that way for a time corresponding to the retrace time, or slightly less, at the end of which time an input pulse 175 is produced which causes the magnetic shift register to be responsive to the pulses 165 and 181.

Upon application of the pulse 181 to core 151, core 152 is caused to be switched to the abnormal state with core 151 returning to the normal state. The switching of core 152 to the abnormal state also brings the transcharger 17 to its threshold of setting.

If core 151 is coupled to the transcharger 17 which controls the first electroluminescent cell 191, then the pulse 181 should follow the starting pulse by the time difference existing between the required excitation of the successive electroluminescent cells.

Pulses 165 and 181 cause the advancement of the switching operation along the series of cores utilized in the magnetic shift register. The amplitude of the video or pattern pulses 197 are equal to the amplitude of the video information at the time each of the shifting pulses are produced and are passed into the transcharger array so that the video information pulse for the electroluminescent cell 191, for example, will be at a time coincident with the pulse 181 which activates the core 151 which therefrom adjusts the transcharger to its threshold of setting.

In these types of circuits, the light energizing pulse is not applied to the transcharger at the same time that the video information bearing pulse is applied to the transcharger. The light energizing pulses are provided by an alternating voltage previously described in connection with the transcharger illustrated in Figure 2. In between the pulses 181 and 165 shown in Figure 4, for example, a positive energizing pulse 199 followed by a negative pulse 201 is applied to the transcharger 17.

Figures 5, 6:
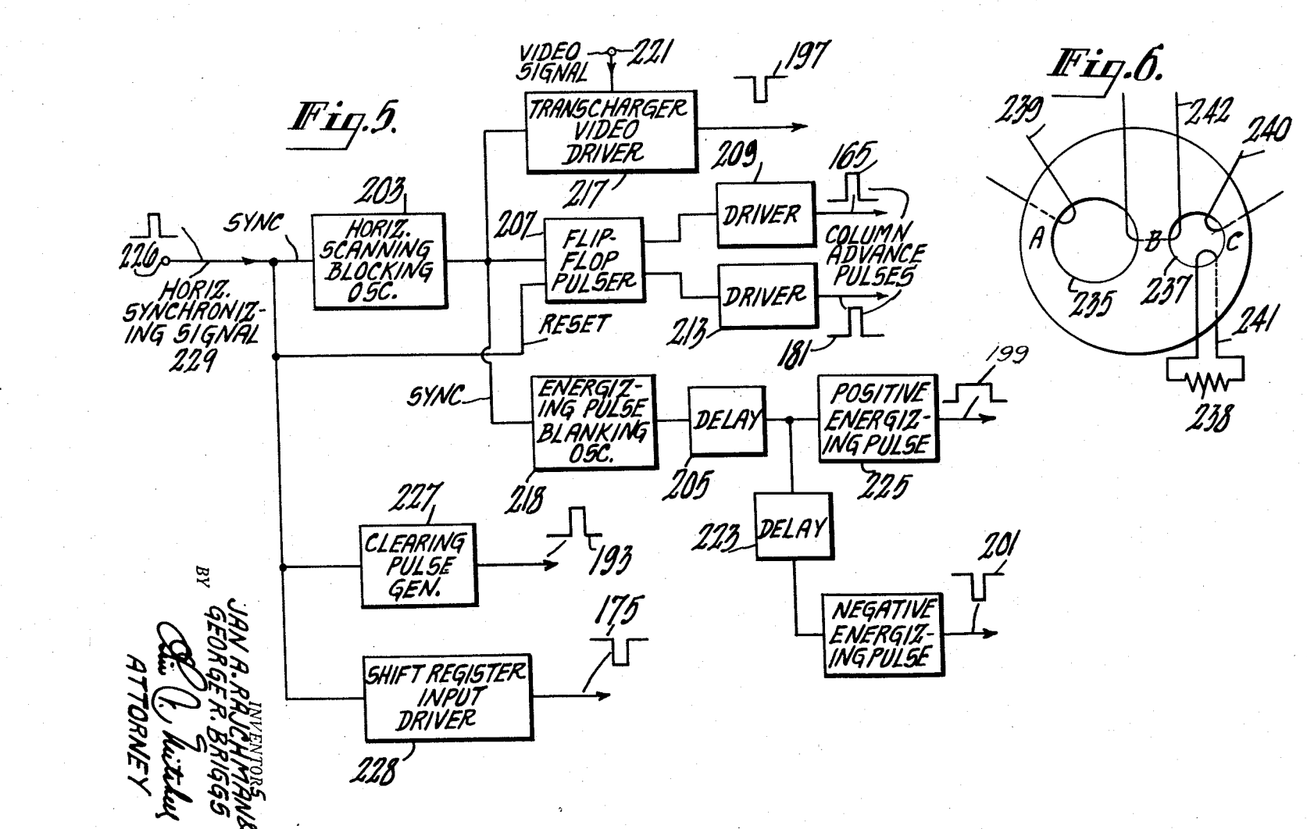
Figure 5 shows a block diagram of a driving circuit which may be utilized for controlling the circuit shown in Figure 4.
Figure 6 shows one form of a transfluxor.

An illustrative circuit for producing the pulses described in Figure 4 is shown in block form in Figure 5. Here the horizontal synchronizing signal 229 which has been separated from the video signal in the receiver is used to synchronize a horizontal scanning blocking oscillator 203 which operates at a frequency such that the period of oscillation is equal to the basic time interval required between shifting operations in the shift register described in Figure 4. This oscillator 203 triggers a flip-flop pulser 207 which alternatively applies pulses to the shift register advance pulse devices 209 and 213; these in turn generate drive pulses 165 and 181. The horizontal scanning blocking oscillator 203 also triggers the transcharger video driver 217, which generates pulses 197 of amplitude proportional to the video signal voltage from the receiver terminal 221 at the instant of triggering. The horizontal scanning blocking oscillator 203 also synchronizes another blocking oscillator 218 running at the same or some sub-multiple frequency. The output pulses from this oscillator 218 are delayed by the delay circuits 205 and 223 and generate the positive and negative energization pulses 199 and 201 in the positive and negative energizing pulse circuits 225 and 226 respectively. The horizontal synchronizing signal 229 also generates the transcharger row clearing pulse 193 by means of the clearing pulse generator 227. This signal 229 also develops the input pulse 175 to shift register of Figure 4 by means of the shift register input driver circuit 228.

When the horizontal synchronizing signal 229 arrives, the selected row of transchargers corresponding to the row of transfluxors shown in Fig. 4 is cleared and simultaneously the core 151 is switched to the abnormal state. After a prescribed time interval the pulse 181 occurs and the core 152 is switched to abnormal state with core 151 switched back to the normal state. After an equal time interval pulse 165 occurs and core 153 is switched to the abnormal state with core 152 switched back to normal state. As mentioned above, the first few shift register stages can be arranged to drive dummy loads to permit the row pulse time enough to clear the transcharger row. In this case, for example, the first two cores 151 and 152 could drive dummy loads enabling the clear pulse to have two shifting time intervals to accomplish the clearing of the transcharger row. Core 153 could then be connected to the first transcharger 17 in the row. The video signal 221 present at the instant core 153 is driven by pulse 181 would then determine the amplitude of the first video pulse applied to the row of transchargers. The coincidence of this pulse and the output pulse from core 153 would then determine the light output from the first light cell 191 in the row. The process is repeated for the second light cell, etc.

The time interval between the horizontal synchronizing signals 229 is large enough that the magnetic shift register has time enough to scan the whole row of transchargers. When the whole row has been scanned all magnetic shift register cores are in the normal state and remain that way until the next horizontal synchronizing signal 229 is received.

The energization pulses 199 and 201 are properly spaced in between the pulses 165 and 181.

The circuit shown in Figure 7 illustrates another method of utilizing a magnetic shift register to supply video information to each of the rows of transchargers light cells utilizing principles described in the copending application by Rajchman, Briggs and Lo, entitled "Electric Control Systems," U.S. Ser. No. 511,916. In a true mural image reproducing system a multiplicity of rows are utilized, with the total number of rows bearing a prescribed relationship to the lines of the conventional type of display raster. In addition, the number of elemental areas along each row must be in accord with the image definition required of the image reproducer and with the aspect ratio which is characteristic of the transmitted image.

Figure 7 shows a schematic diagram of a mural image reproducer utilizing one transcharger per elemental light emitting area and which utilizes a column selector circuit of the type described in connection with Figures 4 and 5 and a row selector circuit which utilizes magnetic devices, hereinafter referred to as transfluxors, for not only selecting the row to be scanned but also to supply the video information pulses and the clearing pulses to that row. It is to be understood that the use of the particular type of row and column selector circuits shown in Figure 7 is intended to illustrate only one means for performing these functions. The circuits to be described, however, are reliable, dependable and accurate. The column selector circuit is a magnetic shift register 250 of the type shown in Figure 4 which successively switches threshold setting pulses to each column conductor starting with the first column conductor 253 and continuing until the last column conductor 260 is reached. The successively generated pulses 181 and 165 are applied to the array of cores in the column magnetic shift register in the manner described in connection with the circuit shown in Figure 4 and the transchargers 17 are successively "set to threshold" along, for example, the column conductor 253, then the column conductor 255, and so on. The resistor 259 is a load for the last core 261, replacing the core load present in the other stages.

A horizontal synchronizing pulse 175 is applied through the line 262 which changes the state of the first core 263 to start the column magnetic shift register 250 in action.

The row selector circuit of the mural image reproducer shown in Figure 7 is in the form of a row magnetic shift register 290. The row magnetic shift register performs the function of applying clearing pulses to each row and also supplying the video pulse information to the proper row during the scanning process. The video signal is commutatively distributed by the row magnetic shift register 290. To accomplish this function the row magnetic shift register utilizes transfluxors rather than cores. One form of transfluxor is shown in Figure 6. The transfluxor comprises a core of a magnetic material such as a molded ceramic ferrospinel which has a rectangular hysteresis loop and consequently a remanent induction substantially equal to the saturation induction. The simplest type of transfluxor core shown in Figure 6 has two holes 235 and 237 preferably of unequal diameter. The legs B and C are located adjacent to the smaller hole 237. The cross-sectional areas of legs B and C, taken along an axis passing through the centers of holes 235 and 237, are equal and their sum is smaller than the cross-sectional area of leg A adjacent to only hole 235. Windings on the various legs may be single or multiturn. Unlike the magnetic cores of the type used in the column magnetic shift register 250 which are capable of on and off action, the transfluxor is capable of providing continuous control of power to, say, a load 238 by proper use of control voltages which control the flux states in the various legs, A, B, and C. A simplified description of the operation of the transfluxor, which is described in detail in the co-pending application by Rajchman bearing the title "Magnetic Systems" and bearing the U.S. Serial No. 473,709, is presented as follows: Assume first that an intense current pulse is sent through the winding 239, which passes through hole 239 in a direction to produce clockwise flux-flow and of an amplitude sufficient to saturate legs B and C. These legs will remain saturated after the elapse of the pulse since remanent and saturated inductions are almost equal. Let an alternating current be applied through the winding 240 which passes through hole 237. This alternating current will tend to produce flux flow around the small hole 237 by way of legs B and C. The phase of the current tending to produce clockwise flux flow will produce no flux change in either leg because leg C is saturated and no further flux can flow through it. Similarly, in the counterclockwise phase, saturation in leg B will block any possible flux change. It follows therefore that no power will be coupled from the winding 240 to the output winding 241 which also passes through hole 240 and is connected to the load 238. In this state the transfluxor is "blocked."

Assume that a pulse of current is sent through the winding 242 of a polarity, which passes through both holes 235 and 237, tending to produce flux flow upwards through leg B. Flux cannot flow through leg C which is saturated but can flow through leg A. The necessary continuity of flux flow will be satisfied by an interchange of flux between legs A and B which will leave leg A with zero flux and leg B with a reversed state of saturation. In this condition the alternating current linking leg C, tending to produce flux flow around the small hole, will, in fact, produce such a flux flow. The first counterclockwise phase of the alternating current through winding 240 will reverse the flux, the next counterclockwise phase will reverse the flux again and so on indefinitely. An alternating voltage will be induced in the output winding 241 and a current will flow in the output load 238. This is the "unblocked" condition of the transfluxor.

The output of the transfluxor can be set to any level in a continuous range (although this property is not used in shift register 290) in response to the amplitude of a single setting pulse. For example, consider the transfluxor 233 in its "blocked" condition. Now let a setting pulse be applied through the large hole 239 by way of the winding 239 whereby this setting pulse is of opposite polarity from that of the "blocking" pulse. This setting pulse may actually be applied by way of another winding through the large hole 235. A magnetizing force proportional to this current is produced around the large hole 235. This force is greatest at the periphery of the hole and diminishes gradually with distance. For a given amplitude of the setting current there will be a critical circle separating an inner zone where the magnetizing force is larger than the threshold magnetizing force required to reverse the sense of magnetization, and an outer zone where this field is smaller than the threshold value. A priming pulse applied by way of winding 242, which passes through both holes 235 and 237, can change only that part of the flux which has been set or trapped into leg B by the setting pulse. This flux flows through leg C which is much closer than leg A and where an equal amount of flux change is produced. A driving pulse passed through the winding 240 will produce a downward magnetization of leg C which will saturate that leg and retransfer the trapped amount of flux back to leg B. The succession of alternate priming and driving pulses will cause interchange between legs B and C of an amount of flux just equal to that initially set into leg B. It is recognized that the operation of the transfluxor 233, is analogous to the operation of the transcharger 17 shown in Figure 2. This is due to the fact that both transfluxor and transcharger are hysteretic devices and are subject to control by setting, priming and driving pulses or to any succession of pulses which controls the states of flux or charge in the device to provide control of power or energy reaching an output load.

Returning to the row magnetic shift register 290 whose schematic diagram is included in Figure 7, the operation of this circuit in conjunction with the mural image reproducer may be described as follows; a pair of trains of pulses $V_1$ 291 and $V_2$ 292 are formed in a circuit similar to the circuit utilized for generating the pulses 165 and 181. These pulses are generated alternating at a rate and sequence conforming to the requirements of row selection of the mural image reproducer. The line 293 carrying the $V_1$ pulse 291, passes through the large hole 294 of the transfluxor 295, through the small hole 297 of the transfluxor 299, through the large hole 301 of the transfluxor 303, and so on. The line 300 carrying the $V_2$ pulse 292 is caused to pass through the small hole 305 of the transfluxor 295, through the large hole 307 of the transfluxor 299, through the small hole 309 of the transfluxor 303, and so on. The purpose of having the line passing through the large hole of one transfluxor and then through the small hole of the succeeding transfluxor rather than through the large holes of the alternate transfluxors in a manner similar to that employed in the column magnetic shift register 250 is to confine the change of flux due to pulses $V_1$ 291 and $V_2$ 292 to the flux path around the larger aperture with none flowing around the path about both apertures. The flux path around the smaller aperture is utilized for controlling the transmission of the video information to the transchargers.

The portion of each transfluxor around the large aperture can be considered as a single core of a type similar to that shown in Figure 4. The output of each large aperture is coupled to the large aperture of the next transfluxor to form a transfer loop. For example, winding 296 couples the output of the large aperture of transfluxor 295 to the large hole of transfluxor 299 via winding 298 and diode 315. The current flowing in this transfer loop, while the transfluxor 295 is being switched from the abnormal state back to the normal state, switches transfluxor 299 to the abnormal state. The advance pulse 292 then repeats the process, switching transfluxor 299 to the normal state again and switching transfluxor 303 to the abnormal state. When each transfluxor is in the abnormal state, the flux path around the small aperture is unblocked and a video pulse 312 can be transmitted through that particular transfluxor to the corresponding row of transchargers. The current flowing in the transfer loop also passes through a resistance 302, developing a voltage which can be utilized to clear the row of transchargers associated with the transfluxor being set into the abnormal state by this loop current. For example, this current, generating a voltage in resistance 302 will clear all of the transchargers in row 317 to perform the function described in connection with the clearing pulse C utilized in the circuit shown in Figure 4. Shortly after the row scan advance pulse $V_2$ is presented, a prime pulse $P_p$ is passed through all the transfluxors in the row magnetic shift register 290 using the connection whereby the line 314 passes from the large hole to the small hole of any one transfluxor before passing on to the next large hole. The prime pulse $P_p$ sets the transfluxor so that the flux direction around the small hole of the transfluxor will be of the correct polarity as discussed above in connection with Figure 6. A sampled video pulse $P_v$ will thereupon pass through the small hole 309 of transfluxor 303 and induce current through the rectifier 321; this current will develop a negative voltage drop across resistance 302 which is applied to all of the transchargers of the first row 317. The particular transcharger in the first row 317 which is set to threshold by a controlling signal from the column magnetic shift register 250 will be effected. The prime pulse $P_p$ and the sampled video pulse $P_v$ are alternately applied to the row magnetic shift register 290. The timing of the sampled video pulse $P_v$ is in proper coincidence with the pulses from the columns magnetic shift register 250. Each of the transchargers in the first row 317 will be set according to the video information. After the first row 317 has been scanned, a row scan advance pulse $V_1$ 291 is applied which switches transfluxor 331 into an abnormal state and causes the transfluxor 303 to return to normal state and to develop a clearing current which passes through the rectifier 333 and generates a clearing voltage for all of the transchargers in the second row 335.

The prime pulse $P_p$ and the sampled video pulse $P_v$ then cause the transfluxor 331 to apply properly timed sampled video information to the second row of transchargers 335. The scanning operation previously described is repeated until each of the rows has had video information applied to each of its transchargers. Each selected transcharger, set according to video information corresponding to the location of the electroluminescent cell coupled to that transcharger, will cause light output from the electroluminescent cells using energy derived from positive and negative energizing pulses applied to the terminal 440. In an interlaced television system, the rows will be sampled in the sequence 1, 3, 5 . . . followed by the row sequence 2, 4 . . . as is employed in a normal television scanning system and a plurality of row magnetic shift registers may be utilized.

When any transfluxor in the row magnetic shift register 290 is in the normal state there is no response to the video and prime pulses in the row associated with that transcharger; only when the transfluxor has been switched into the abnormal state, is the condition set up whereby the transfluxor is then responsive to the prime and sampled video pulses.

The row magnetic shift register 290 also make provision for the fact that each of the component transfluxors may not have perfect control characteristics. Any one of the transfluxors which is not in the abnormal state responds to a video or advance pulse to a certain extent because the saturation characteristics of this transfluxor may not be perfect. It is possible to cause the operation of the row magnetic shift register 290 to deteriorate or for the small changes in flux in successive transfluxors to build up during the process of switching on of each horizontal line so that the row magnetic shift register 290 may start to select two or more rows of transchargers at the same time. For example, a transfluxor in a normal state may be able to switch the next transfluxor toward the abnormal state to a slight degree when hit by a pulse. This may be prevented by using the magnetic cores 351 and 353 which, for example, constitute a flux absorbing mechanism between each of the transfluxors of the row magnetic shift register 290. For example, when the clearing pulse passes through the line 335 which is connected to rectifier 333, this current will also be caused to pass through the large hole of the core 353 to which is applied the $V_2$ pulse 292. The line 355 also passes through the large hole 357 of transfluxor 331 to complete the transfer loop. The core 353 will absorb any induced signal noise during $V_1$ pulse 291 which could turn transfluxor 331 prematurely to the abnormal state. The line 300 passes the $V_2$ pulse through the magnetic core 353 and this pulse returns the magnetic core 353 back to its original state. In like fashion, currents caused to pass through the magnetic core 351 during the $V_2$ pulse 292 when the clear current passes through the diode 315, for example, will be absorbed in the magnetic core 351. The line 293 which passes through the magnetic core 351 will pass the $V_1$ pulse 291 through this core in a manner whereby the state of the magnetic core 351 will be returned to the state which it occupied before the $V_2$ pulse 292 was applied.

The magnetic core 371 in like manner will absorb noise induced by the video pulse 312 in "normal" transfluxors. The prime pulse of the row magnetic shift register 290 is caused to pass through the winding 314 which also passes through the magnetic core 371 in a manner which returns the magnetic core to its state prior to the video pulse $P_v$.

The rectifier 373 is necessary to prevent the clearing pulse generated by the row advance pulses which advance the row magnetic shift register from being dampened by the video information carrying circuits; in like manner, the clearing pulse circuit is also prevented from dampening the video information bearing circuit by rectifiers 376 and 378.

Figure 8:
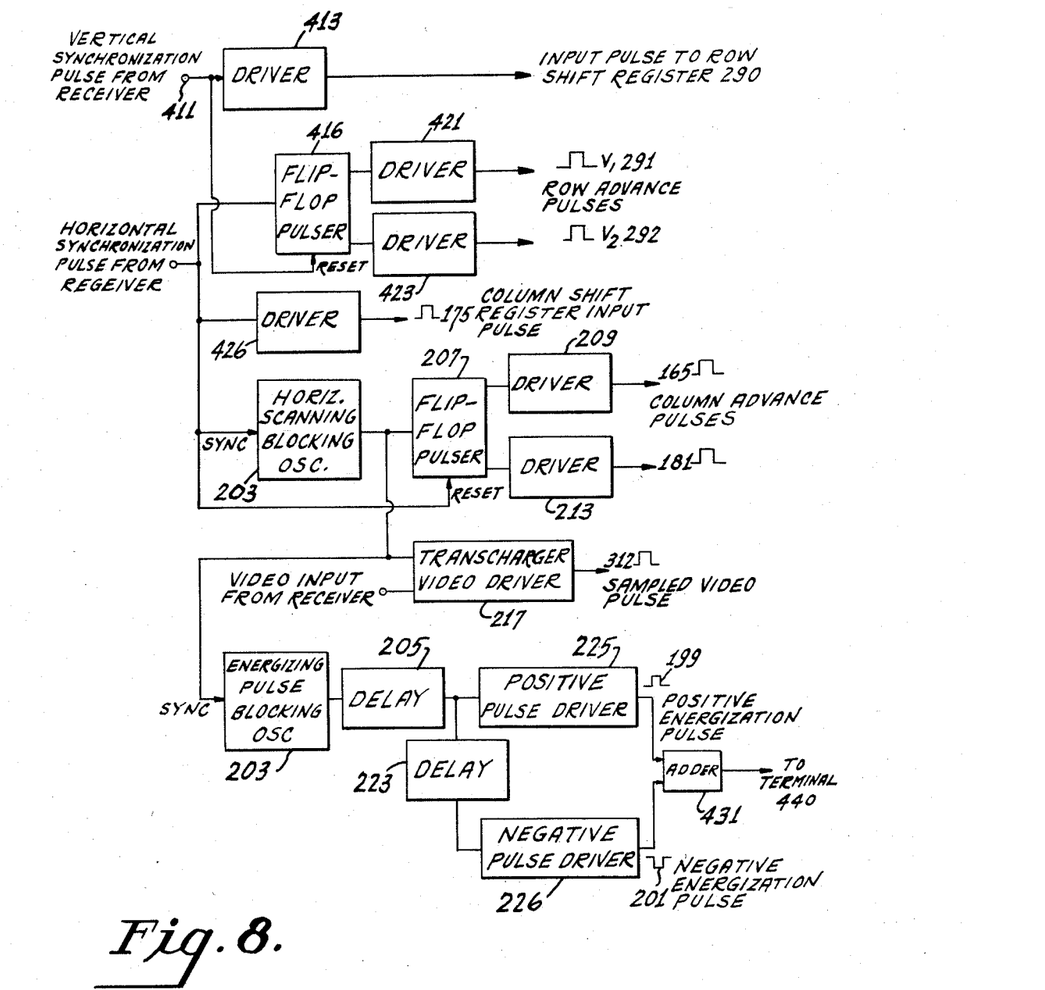
Figure 8 shows a block diagram of a driving circuit for the row magnetic shift register of Figure 7.

Figure 8 shows a block diagram of the circuits needed at the output of a receiver to drive the circuits shown in Figure 7. As mentioned previously, the horizontal and vertical synchronization signals are separated from the video signal in the receiver. In addition, the vertical and horizontal synchronization signals can be separated from each other by well-known techniques. The vertical synchronizing signal applied to terminal 411 is shaped by a driver 413 and serves as the input pulse to the row shift register 290. This places the first transfluxor 295 into the abnormal state and starts the row selection process. The vertical synchronizing signal also resets a flip-flop pulser 416 which produces the row advances pulses $V_1$ 291 and $V_2$ 292 at the outputs of the driver circuits 421 and 423 respectively and insures that the first row advance pulse to occur will be $V_1$ 291. The row advance pulses themselves are triggered by the horizontal synchronization pulses. These same pulses furnish the input pulses 175 to the column shift register by way of the driving circuit 426. As mentioned before, the row advance pulses 291 and 292 unblock in sequence each row transfluxor and also the corresponding transcharger in that row. At the same time, the column shift register is set into action. The horizontal scanning oscillator 203 drives the flip-flop pulser 207 which in turn energizes the drivers 209 and 213 to furnish the column advance pulses 165 and 181 to the column shift register. These pulses are synchronized with the horizontal sync pulse and to insure that the column first advance pulse will be 181, the flip-flop pulse is reset by the horizontal sync pulse. The horizontal scanning oscillator 203, in the manner also shown in Figure 5, supplies trigger pulses to the transcharger video driver 217 which develops the sampled video pulse 312 and also supplies sync pulses to the energization pulse blocking oscillator 203.

The energization pulse blocking oscillator 203 drives the positive pulse driver 225 and the negative pulse driver 226 to produce the positive and negative energization pulses 199 and 201. The proper timing of these pulses is provided by the delay circuits 205 and 223. The positive and negative energization pulses 199 and 201 are added together in the adder circuit 431 from which circuit they are applied to the terminal 440 of the mural image reproducer of Figure 7.

The mural image reproducer shown in Figure 7 shows only a small number of the transcharger and luminiferous cells required for a television system which can reproduce all of the video information with full detail corresponding to a 525 line picture. It is recognized, however, that the number of rows and columns and the number of switching sequences in both the row and column magnetic shift registers may be increased without detracting from the teachings of the present invention.

The present invention may be utilized to display color images or patterns by utilizing elemental areas of electroluminescent cells which provide light of required primary colors. For example, if each of the rows of the previously described mural image reproducer shown in Figure 7 is constructed to include subrows of electroluminescent cells for providing light output of each of three component colors, say, red, green and blue, video or pattern information corresponding to each of the component colors provided to the corresponding electroluminescent cell at the proper time will provide a picture in full color.

Figure 9:
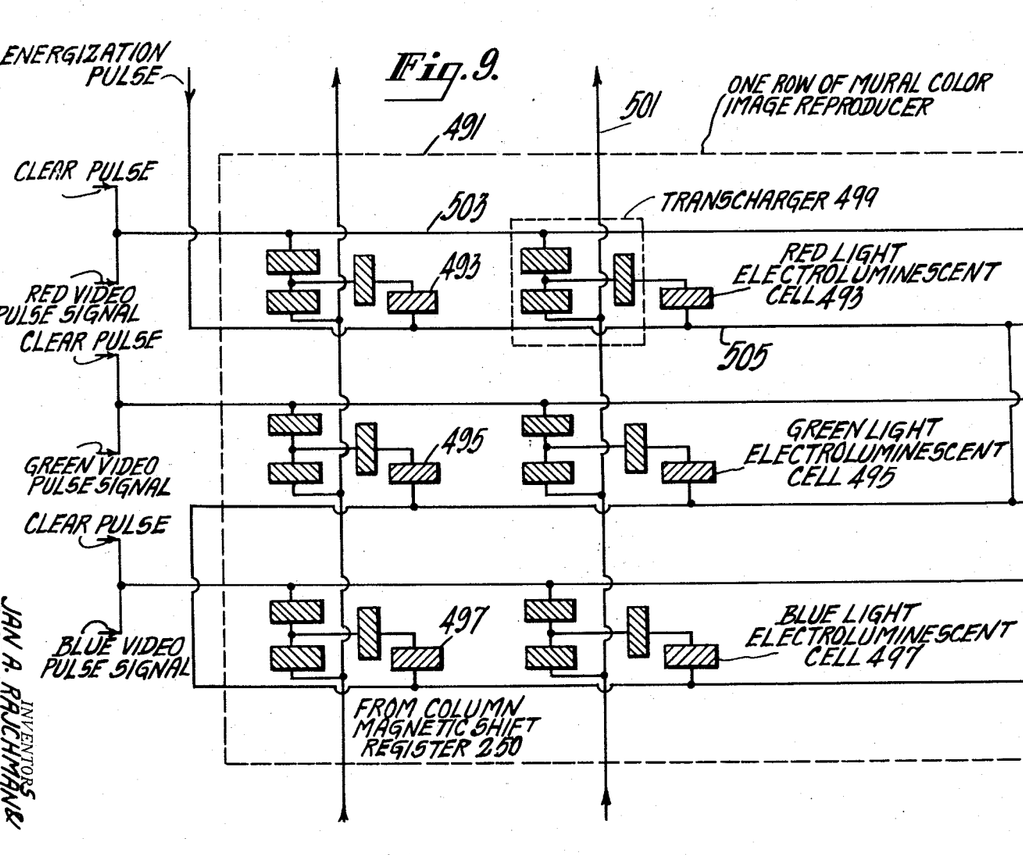
Figure 9 illustrates a schematic diagram of a section of an image reproducer utilizing transchargers which may be used for reproducing color images.

Figure 9 shows one section of a row of a typical mural color image reproducer utilizing the present invention. This section is boxed in the dotted line bearing the numeral 491. This row of the mural color image reproducer actually consists of three lines. One bus 505 supplies energizing information to the red light electroluminescent cells 493; this bus supplies energizing information to the green light electroluminescent cells 495; bus 505 also supplies energizing information to the blue light electroluminescent cells 497. The red light electroluminescent cell 493, for example, is controlled by the transcharger 499 which is controlled by the threshold setting pulses provided by the bus 501 from the column magnetic shift register 250, and clear pulses and red video pulse signals from the bus 503, and energization pulses from the bus 505. Each of the subrows shown in Figure 9 functions in the same manner as the rows shown in Figure 7. The television signal receiver operating in conjunction with the mural color image reproducer must demodulate an incoming color television signal and produce pulses or signals relating to each of the component colors.

The circuit shown in Figure 9 illustrates the various transchargers involved as being arrayed substantially in columns. It is to be appreciated, however, that the transchargers with their associated electroluminescent cells may be staggered according to prescribed orientations and may be, for example, sequentially energized to accomplish line sequential representation of color information, i.e. one entire subrow in a row could be energized followed by the successive energizing and scanning of the other subrows.

Figure 10:
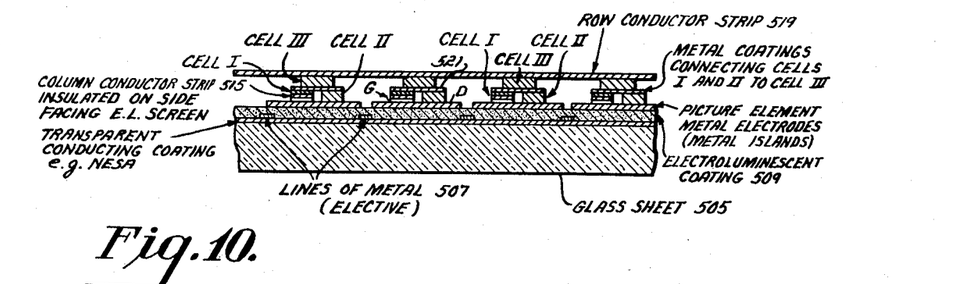
Figures 10 and 11 illustrate constructional details of a section of an image reproducer utilized in the present invention.
Figure 11:
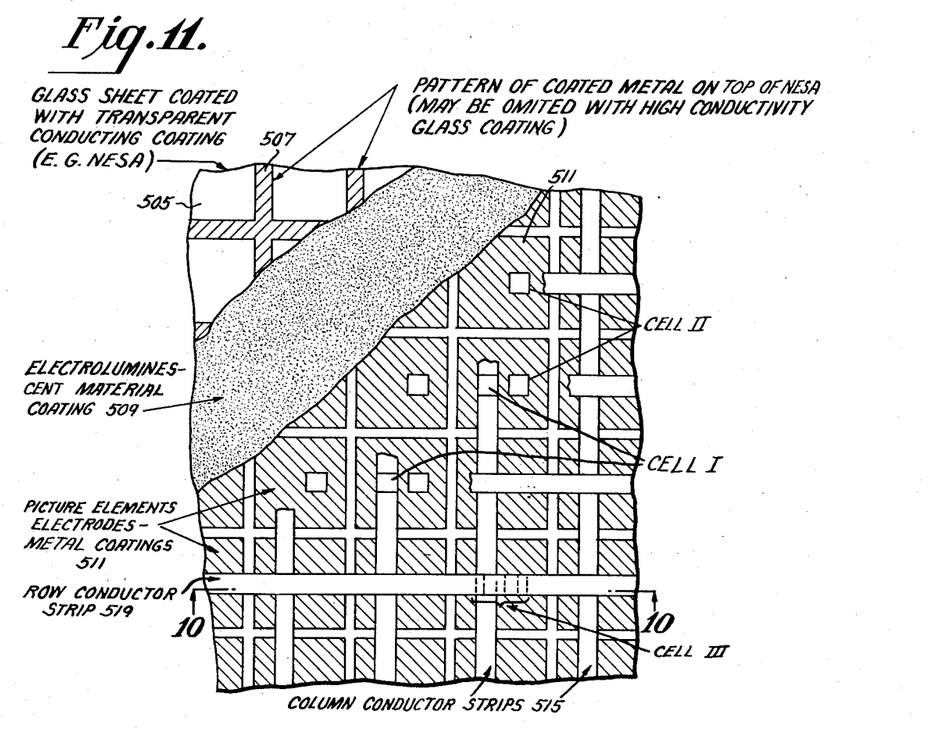

Figures 10 and 11 illustrate one method of construction of the mural image reproducer of the present invention. A glass sheet 505, the size of the desired resultant picture or pattern, is coated with a transparent conductive coating such as Nesa or tin chloride. To reduce the voltage drops due to the resistance of the glass coating, a pattern of metal lines 507 may be coated on top of the glass coating so as to "frame" each picture element. The glass sheet 507 with this transparent and metal pattern coating is thereupon coated with a layer of electroluminescent material such as activated zinc sulphide powder suspended in a plastic dielectric such as araldite or krylon. The electroluminescent material coating is given the numeral 509. A mosaic of square metal islands 511 is then coated on top of the electroluminescent materials to form the electrodes of the individual picture elements. On top of each square metal island 511, a ferroelectric cell is attached. This is ferroelectric cell II, hereinafter referred to as cell II, and may be considered as the ferroelectric cell for controlling the electroluminescent cell. These ferroelectric cells can be made, for example, by using $BaTiO_3$ in single or polycrystalline form. The square metal island is one of the electrodes of cell II; in another form of the invention, the cell II may be coated with metal electrodes before it is attached to the array. The column conductor strips 515 are installed on the array, utilizing an insulating layer G between these column conductor strips 515 and the square metal islands. Ferroelectric cells I, hereinafter referred to as cells I, are thereupon installed as shown on the column conductor strips 515 with the arrangement that both cells I and II respectively have the same height above the glass surface. A ferroelectric cell III, hereinafter referred to as cell III, is electrically connected to the top surfaces of cells I and II. Finally, row conductor strips 519 are arrayed with ferroelectric cells III shown in Figures 10 and 11. The cells III are spaced a picture element apart. Cell III has a larger area than either cell I and II and actually spans over cells I and II. The aforementioned electrical connection between cells I, II, and III consists of a metal electrode 521 constructed between cells I and II and cell III. This metal electrode may be fabricated by metal coating cells I, II and III in advance and then soldering the cells together.

It follows from the construction described above that cell II is thicker than cell I; this is desirable since cell I is to have a lower coercive voltage than cell II. Also cell III has a larger area than cells I and II since the charge carried through cell III is the sum of the charges carried through I and II. A typical set of dimensions associated with the structure shown in Figures 10 and 11 but not limiting the scope of the invention, many be listed as follows: The picture elements are .100 inch apart for a television picture having 525 lines; this spacing would lead to an image approximately 4½′ by 6′. The glass sheet of that size would be from ⅛″ to ¼″ thick. The conductive transparent coating is very thin, typically a fraction of a 1000th of an inch. The electroluminescent layer is approximately 1 mil (001″) thick. The metal islands are from 2 to 5 mils thick and approximately 0.90″ square. The ferroelectric crystal required to drive elements of this capacity are very small, on the order of magnitude of from .004 to .20″ on a side and from .001 to .01″ thick. The metal strips for the row and column conductors will have substantially the width of the ferroelectric crystals.

There are several advantages of using transchargers as switching, control and storage elements in an image reproducer of the present invention.

A. The transcharger is a "voltage" device rather than a "current" device and its effective impedance is higher; therefore it is easier to obtain the relatively high voltages required for effective light output from electroluminescent cells.

B. The fabrication of transchargers is relatively easy as the ferroelectric cells are either attached to V or H lines or else to the surface of the array itself. No components other than the ferroelectric cells and their associated connections are required.

C. The dead storage of a latent picture using transchargers can be indefinitely long, such as is the case with transfluxors, i.e., once the transhysteretic devices have been set by scanning through the frame, the setting will remain unaltered indefinitely without any holding power. When the light energizing A.-C. power is applied, the stored latent picture becomes visible and can be viewed indefinitely.

D. The present device can be used not only for television display but to display other information—for example, information from radar. The storage capabilities of transhysteretic devices are particularly advantageous in this case. Another important application of the invention is for the display of the output of a computer.

In these two applications and others the "scanning" may not be repetitive; various picture elements may be set in arbitrary order. In other words, the transhysteretic-driven display devices have what is often called "random access" which means that access to any preselected position can be obtained at will at any time without regard to previous accesses or to any address searching schedule. The "coordinate" signals in the foregoing description were assumed to be those giving normal television scanning as a matter of illustration.

E. It is also obvious that the discrete luminiferous elements need not be arranged in a rectangular array but may be arranged on a cylinder, sphere, or any other surface. The density of elements need not be constant, but can vary according to any desired distribution.

Having described the invention, what is claimed is:

1. In combination, an electrical display array including a plurality of elemental light emitting areas whose light output is controllable, means for developing a first set of signals representative of the location of each elemental area, means for developing a second set of signals indicative of display information corresponding to each elemental area and coupled to be capable of controlling the light output of that elemental area responsive to applied signals, a ferroelectric device corresponding to each elemental area, and means for applying said first and second set of signals to said ferroelectric device to control the light output of the corresponding elemental light emitting area.

2. In combination, an electrical display array including a plurality of elemental light emitting areas whose light output is controllable, means for developing a first set of signals representative of the location of each elemental area, means for developing a second set of signals indicative of display information corresponding to each elemental area, a ferroelectric device corresponding to each elemental area and coupled to be capable of both storing applied signal information over a continuous range of signal amplitude and of controlling the light output of the corresponding elemental area according to the stored signal information, and means for applying said first and second set of signals to said ferroelectric devices to store therein the display information corresponding to that elemental area and for controlling the light output of the elemental area in accordance with said stored display information.

3. A mural display system for producing a luminous display in accordance with image information signals comprising, a first set of column conductors and a second set of row conductors arrayed so that each conductor of said first set contiguously interesects each conductor of said second set, means for applying said image information signals in a selected order to the intersections of said row and column conductors, ferroelectric material means coupled to the corresponding row and column conductor at each intersection for storing image information corresponding to that intersection, and light emitting means coupled to each ferroelectric material means for producing light output according to said stored image information.

4. In combination, a row of elemental luminiferous areas, means for developing a first set of signals representative of the location of each luminiferous area in said row, means for developing a second set of signals including indication of the information to be displayed at each luminiferous area, a transcharger corresponding to each luminiferous area, and means for applying said first and second set of signals to each transcharger, means for utilizing said transcharger for controlling the light of each luminiferous area in response to said first and second sets of signals.

5. An image display system adapted to receive image information signals comprising a row of electroluminescent cells, a group of ferroelectric devices operatively connected as a transcharger coupled to each of said electroluminescent cells, means for applying said information signals in a selected order to each of said group of ferroelectric devices for producing a stored charge state in said ferroelectric devices indicative of the image information corresponding to that electroluminescent cell, and means for producing light output from each electroluminescent cell corresponding to the stored charge state of the corresponding group of ferroelectric devices.

6. In an image reproducing system adapted to receive an intelligence signal indicative of an image to be reproduced, in combination, a mural image reproducer having a multiplicity of controllable-light-output light-emitting elemental areas, means for generating a first set of signals indicative of the location of each of said multiplicity of light-emitting elemental areas along a first direction of alignment of said elemental areas, means for generating a second set of signals indicative of the location of each of said multiplicity of light-emitting elemental areas along a second direction of alignment of said elemental areas, means for deriving an information signal from said intelligence signal indicative of the image information corresponding to each elemental light-emitting area, a transcharger corresponding to each elemental area and connected to be capable of controlling the light output of the corresponding elemental area in response to applied signals, means to apply in coincidence one signal of said first and one signal from said second set of signals and said information signal to each of said transchargers for adjusting the light output of the corresponding light-emitting elemental area in accordance with said coincidence of selected signals and said image information signal corresponding to the location of said elemental area.

7. In an image reproducing system adapted to receive an intelligence signal indicative of an image to be reproduced, in combination, a mural image reproducer having a multiplicity of light-emitting elemental areas whose light output is controllable, means for generating a first set of signals indicative of the location of each of said multiplicity of light-emitting elemental areas along a first direction of alignment of said elemental areas, means for generating a second set of signals indicative of both the location and the image information corresponding to each of said multiplicity of light-emitting elemental areas along a second direction of alignment of said elemental areas, a group of ferroelectric cells each operatively connected to be capable of controlling the light output of a corresponding elemental area over a continuous range of light intensities responsive to applied signals, means to apply in coincidence said first and second sets of signals to each of said group of ferrolectric cells for utilizing the control properties of said group of ferroelectric cells for producing the light output of said light-emitting elemental area in accordance with said signal coincidence and the image information occurring during said signal coincidence.

8. An image display system for producing a luminous display in accordance with image information signals comprising, an array of electroluminescent light producing areas, means for developing a first set of signals indicative of the location of each electroluminescent area, means for developing a second set of signals also indicative of the location of each electroluminescent area and also including image information corresponding to that electroluminescent area, a transcharger corresponding to each electroluminescent area, means for applying said first and second set of signals to each transcharger to cause each transcharger to store the image information corresponding to that electroluminescent area for a predetermined time interval, and means for producing the light output of that electroluminescent area in accordance with said stored image information.

9. A mural image display system for producing a luminous display in accordance with image information signals, comprising, an array of elemental light-emitting areas arranged in rows and columns wherein the light output of each area is controllable, a ferroelectric storage and light output control device at each of said elemental light-emitting areas, means for developing a first set of signals representative of the location and of each elemental area, means for developing a second set of signals indicative both of the image information corresponding to each elemental area and the location of that elemental area, a source of energizing signals, means for applying said energizing signals to each storage and light output device, means for applying said first and second set of signals to each ferroelectric storage and light output control device for storing energy related to the image information corresponding to that elemental area, means for utilizing said stored image information for controlling the light output of the corresponding elemental light-emitting area, and means for developing and applying signals to each ferroelectric storage and light controlling device to remove the stored image information after a preselected time interval.

10. In a television image reproducing system adapted to receive a signal indicative of an image, the combination of, a mural image reproducer having a plurality of column conductors and row conductors, means for applying switching signals to points at the contiguous intersections of said row and column conductors, means for developing image information signals corresponding to each of said points from said television signal, a luminiferous cell and a group of ferroelectric cells at each point, each group of ferroelectric cells arranged with said luminiferous cell and responsive to said switching and image information signals to develop a state of charge indicative of said image information signals, and means to control the light output of each of said luminiferous cells responsive to said state of charge.

11. In a television image reproducing system adapted to receive a television signal indicative of an image, the combination of, a mural image reproducer including a plurality of row and column conductors, light producing means having controllable light output at each contiguous intersection of said row and column conductors, means for developing a plurality of signals related to the location of the intersections of said row and column conductors, means for causing at least one of said plurality of signals to describe image information corresponding to the location of each intersection, a transcharger corresponding to each intersection, means for applying said plurality of signals to said row and column conductors to cause the coincidence of selected signals of said plurality of signals at each intersection to set the corresponding transcharger to a setting corresponding to the image information corresponding to the intersection, and means for utilizing each transcharger setting to control the light output of the corresponding light producing means.

12. In a television image reproducing system adapted to receive a television signal indicative of an image, the combination of a mural image reproducer having a plurality of row and column conductors and a light producing means having controllable light output at an area corresponding to each intersection of said row and column conductors, means for developing a set of column conductor signals indicating the location of selected column conductor relative to the location of each intersection, means for developing a set of row conductor signals indicating both the location of each intersection along each row and also the image information corresponding to that intersection, a transcharger corresponding to each intersection, means for applying said sets of row and column conductor signals to said row and column conductors respectively and including means to set each transcharger to the image information corresponding to the intersection, and means for utilizing each setting to control the light output of the corresponding light producing means.

13. An image display system for producing a luminous display in accordance with image information signals comprising, an array of electroluminescent light producing areas, means for developing a first set of signals indicative of the location of each electroluminescent area, means for developing a second set of signals also indicative of the location of each electroluminescent area but including image information corresponding to each electroluminescent area, a ferroelectric switching, storage and luminosity control device corresponding to each electroluminescent area, means for applying said first and second set of signals to each ferroelectric switching, storage and luminosity control device to store the image information corresponding to that electroluminescent area for a prescribed time interval, and means for controlling the light output of that electroluminescent area in accordance with said stored image information.

14. In a television image reproducing system adapted to receive a television signal indicative of an image, the combination of, a mural image reproducer having a plurality of column and row conductors, means for developing switching signals corresponding to points at the intersections of said row and column conductors, means for developing image information signals corresponding to each of said points from said television signal, a transcharger at each point, means for applying said switching signals and said image information signals to each point to cause each transcharger to be set according to the image information signal corresponding to that point responsive to the coincidence of selected signals of said switching and image information signals, an electroluminescent cell coupled to each transcharger, means for causing each electroluminescent cell to produce light according to the setting to the corresponding transcharger, and means for removing the setting of each transcharger at a time interval following the application of said image information signal to that transcharger.

15. In a television image reproducing system adapted to receive a television signal indicative of an image, the combination of, a mural image reproducer having a plurality of column and row conductors, means for developing row and column switching signals corresponding to points at the intersections of said row and column conductors, means for developing image information signals corresponding to each of said points from said television signal, a trio of ferroelectric cells at each point, each cell having a first terminal and a second terminal, each of said second terminals of said trio connected together, means for coupling the image information signal corresponding to a point and the row switching signal corresponding to the intersection of that point to the first terminal of the first cell of said trio at that point, means for coupling a column switching signal corresponding to said intersection to the first terminal of the second cell of said trio at that point, an electroluminescent cell at each point coupled to the first terminal of the third cell of the trio at that point, and means for applying energization signals to at least the second and third cells of each of said trio and the associated electroluminescent cell.

16. In combination, in a color pattern image reproducing system adapted to provide component color information signals, the combination of, an array of elemental light emitting areas each of whose light output is controllable, selected emitting areas of said array corresponding to each of said component colors, means for developing a first set of signals representative of the location of each elemental area, means for developing a second set of signals indicative of at least the intensity and color of the light output to be displayed at each elemental area, a transcharger associated with each of said elemental areas, means for applying said first and second set of signals to each transcharger for storing the corresponding component color intensity information for intervals of time, and means for applying energy to each transcharger and elemental light emitting area, and means for controlling the light output of the corresponding elemental light emitting area according to said stored information.

17. In a color image reproducing system adapted to provide component color signals indicative of a color image to be reproduced, in combination, a mural image reproducer having a multiplicity of light emitting elemental areas whose light output is controllable, selected elemental areas adapted to provide light output at colors corresponding to each of said component colors, means for generating a first set of signals indicative of the location of each of said multiplicity of light emitting elemental areas along a first direction of alignment of said elemental areas, means for generating a plurality of signals indicative of both the location and the color and intensity of image information corresponding to each component color light emitting elemental area along a second direction of alignment of said elemental areas, a ferroelectric switching storage and control device corresponding to each elemental area, means to apply said first set of signals and said plurality of signals to each magnetic device to cause selected signals occurring in coincidence to store in that ferroelectric switching storage and control device color image information corresponding to the color light emission characteristics of the elemental area corresponding to the ferroelectric device, and means for utilizing said ferroelectric device for adjusting the light output of the corresponding elemental area in accordance with said stored image information.

References Cited in the file of this patent

UNITED STATES PATENTS

| | | |
|---|---|---|
| 2,201,066 | Toulon | May 14, 1940 |
| 2,449,396 | Lamm | Sept. 14, 1948 |
| 2,558,019 | Toulon | June 26, 1951 |
| 2,595,617 | Toulon | May 6, 1952 |
| 2,698,915 | Piper | Jan. 4, 1955 |
| 2,717,373 | Anderson | Sept. 6, 1955 |
| 2,721,950 | Piper et al. | Oct. 25, 1955 |
| 2,736,880 | Forrester | Feb. 28, 1956 |

OTHER REFERENCES

Ser. No. 108,062, Toulon (A.P.C.), published May 18, 1943.

UNITED STATES PATENT OFFICE
CERTIFICATE OF CORRECTION

Patent No. 2,904,626            September 15, 1959

Jan Aleksander Rajchman et al.

It is hereby certified that error appears in the printed specification of the above numbered patent requiring correction and that the said Letters Patent should read as corrected below.

Column 9, line 32, after "all" insert -- the --; column 12, line 43, for "rectifiier" read -- rectifier --; column 16, lines 33 to 35, strike out "and coupled to be capable of controlling the light output of that elemental area responsive to applied signals" and insert the same after "area" and before the comma in line 36, same column.

Signed and sealed this 26th day of April 1960.

(SEAL)
Attest:

KARL H. AXLINE                         ROBERT C. WATSON
Attesting Officer                     Commissioner of Patents